(12) United States Patent  
Reilly et al.

(10) Patent No.: US 9,264,513 B2  
(45) Date of Patent: Feb. 16, 2016

(54) AUTOMATIC SCHEDULING OF CONTENT DELIVERY

(71) Applicant: LinkedIn Corporation, Mountain View, CA (US)

(72) Inventors: John Reilly, San Carlos, CA (US); Alexandre Lee, Menlo Park, CA (US); Russell Melick, Sunnyvale, CA (US); Joseph Adler, Mountain View, CA (US); James Tac Lau, Mountain View, CA (US); Jesse Bellister, Millbrae, CA (US)

(73) Assignee: LinkedIn Corporation, Mountain View, CA (US)

( * ) Notice: Subject to any disclaimer, the term of this patent is extended or adjusted under 35 U.S.C. 154(b) by 265 days.

(21) Appl. No.: 13/713,991

(22) Filed: Dec. 13, 2012

(65) Prior Publication Data

US 2014/0173020 A1    Jun. 19, 2014

(51) Int. Cl.  
*H04L 29/08* (2006.01)  
*H04L 12/18* (2006.01)

(52) U.S. Cl.  
CPC ............ *H04L 67/32* (2013.01); *H04L 12/1881* (2013.01); *H04L 67/325* (2013.01)

(58) Field of Classification Search  
USPC .......................... 709/206, 224, 231; 705/131  
See application file for complete search history.

(56) References Cited

U.S. PATENT DOCUMENTS

| | | | | |
|---|---|---|---|---|
| 6,980,205 B1* | 12/2005 | Zettsu | ............... | G06F 17/30893 345/418 |
| 2002/0128904 A1* | 9/2002 | Carruthers | ............. | G06Q 30/02 705/14.43 |
| 2008/0248788 A1* | 10/2008 | Smith | ................. | H04M 3/4878 455/414.3 |
| 2009/0164287 A1* | 6/2009 | Kies | .................... | G06Q 30/0277 705/1.1 |
| 2009/0282111 A1* | 11/2009 | Jacobs | ............... | H04N 7/17318 709/206 |
| 2010/0146559 A1* | 6/2010 | Lee | ...................... | H04L 12/1822 725/61 |
| 2011/0119126 A1* | 5/2011 | Park | ....................... | G06Q 30/02 705/14.45 |
| 2012/0151012 A1* | 6/2012 | Mustafa | ................. | H04L 65/80 709/219 |
| 2013/0029762 A1* | 1/2013 | Klappert | ................ | A63F 13/12 463/31 |
| 2013/0046810 A1* | 2/2013 | Loew | ...................... | H04L 67/06 709/203 |

FOREIGN PATENT DOCUMENTS

JP          2011077833 A  *  4/2011

* cited by examiner

*Primary Examiner* — Natisha Cox  
(74) *Attorney, Agent, or Firm* — Schwegman Lundberg & Woessner, P.A.

(57) ABSTRACT

A content delivery system coupled to a computer network can provide large volumes of content to large numbers of recipients. The content is collected into digests and individual articles to be sent in email via an email channel established by the content delivery system to the recipients through the computer network. Content producers submit content for aggregation into various email deliveries and submit initial scheduling information. The scheduling information may specify target characteristics of preferred recipients of the content as well as general and initial scheduling preferences for email delivery. The content delivery system utilizes the initial scheduling information as a starting point for scheduling email deliveries. The system measures levels of content interaction by the recipients to gauge corresponding interest levels in the content. Using recipient interest levels as feedback, the content delivery system is able to modify and extend scheduling details to optimally schedule further deliveries of content.

17 Claims, 8 Drawing Sheets

AUTOMATIC SCHEDULING OF CONTENT DELIVERY

TECHNICAL FIELD

This patent document pertains generally to online communications, and more particularly, but not by way of limitation, to automatic scheduling of content delivery.

BACKGROUND

The Internet has provided a means for companies to expand their business by making large numbers of online connections with ever-increasing numbers of customers made available to companies through extensive online communication networks. Whether a business is involved in e-commerce, social media, or online gaming, the pervasive nature of Internet connections provides a large audience of recipients in the form of shoppers, users, and customers. As business expands, companies have expanding volumes of information to communicate with these increasing numbers of recipients. The information may include offers, updates, communications with other users, news, and general information, to name just a few of the types of messages, which may collectively, be referred to as content to be delivered to the recipients.

As business expands through the communication leverages the Internet offers, a company may soon face a challenge of communicating large volumes of content to a significant number of recipients. Generally, email or the "email channel" may provide the mainstream of this flow of content. Connecting with recipients through email has become one of the most pervasive means of communicating information between users of the Internet. Through the increasing volume of communication by email, the company and the recipients desire having content that is meaningful and directed towards business goals. Amidst all Internet communication, the concept of delivering a targeted email having the best content for the recipient is a key aspect of the company maintaining a relationship with customers that nurtures business. It directly follows that the requirements of a delivery system may be to determine optimal content for a large number of recipients and to deliver the large volume of content to those recipients via the email channel.

BRIEF DESCRIPTION OF DRAWINGS

Some embodiments are illustrated by way of example and not limitation in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details.

A customer is interested in doing business with a company when the content of communications from the company provide information that the customer is interested in. This means that content may be optimally delivered to recipients, when their interests in browsing and reading information is met. The challenge for a business is having a system that allows product developers and content developers a convenient way to introduce content and develop a delivery specification to target an appropriate audience of recipients. Additionally, the system may utilize an initial delivery specification from developers to automatically generate further scheduling details to match the needs of a broad range of recipients. The system should also be able to check on and give feedback about the interest level of the recipient in the content being delivered according to the schedule. Recipient interest level feedback may optimally be available to the system to modify scheduling of further content deliveries. When the system is convenient to use and able to be highly leveraged, the goal of providing a large volume of meaningfully targeted content to a large number of recipients may be met.

Figure 1:
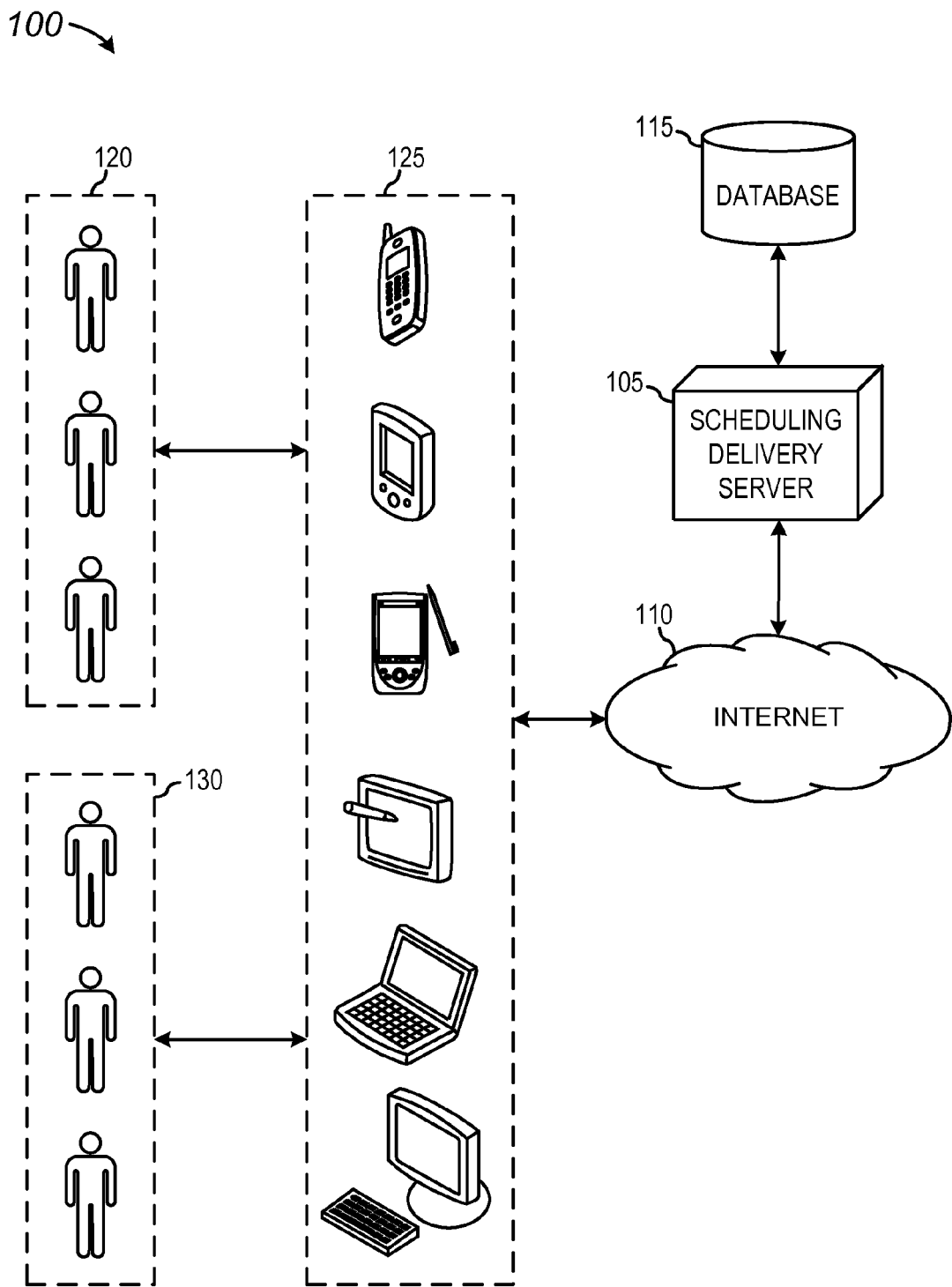
FIG. 1 is a diagrammatic representation of a network environment including a content scheduling and delivery server to automatically schedule content delivery, according to some example embodiments.

FIG. 1 is a diagrammatic representation of a network environment 100 including a content scheduling and delivery server 105 to automatically schedule content delivery, according to some example embodiments. The content scheduling and delivery server 105 is communicatively coupled to a computer network, which may be for example the Internet 110. The content scheduling and delivery server 105 may also be communicatively coupled to a database 115, which may be used to store content and scheduling data relating to the delivery of large volumes of content to a large number of recipients 120. The recipients 120 may use a variety of devices 125 to communicate with the content scheduling delivery server 105 through the Internet 110. Content producers 130 may also use the devices 125 to communicate with the content scheduling of delivery server 105.

The recipients 120 may receive information, news, and articles, for example, as content within email. The receipt of the content and scheduling interactions with the content scheduling and delivery server 105 may be conducted through what may be referred to as an email channel between the recipients 120 and the content scheduling and delivery server 105. The content producers 130 may specify the content that is eventually delivered to the recipients 120 and submit job creation information to the content scheduling of delivery server 105 to assemble particular collections of content within a particular email sent to various of the recipients 120. The content producers 130 may also specify scheduling information to be applied to the initial delivery of the email delivered to the recipients 120. Through a succession of delivery cycles with recipients 120, the content scheduling and delivery server 105 may adjust the scheduling and composition of content within delivered email to accommodate the interest level of the recipients 120 in viewing and reading various email deliveries.

The content scheduling and delivery server 105 may be implemented as a portion of an email server (not shown) according to some example embodiments. The content scheduling in delivery server 105 may also be implemented across more than one physical server according to how functional elements for determining scheduling and conducting delivery may be architected within an overall system environment.

Figure 2:
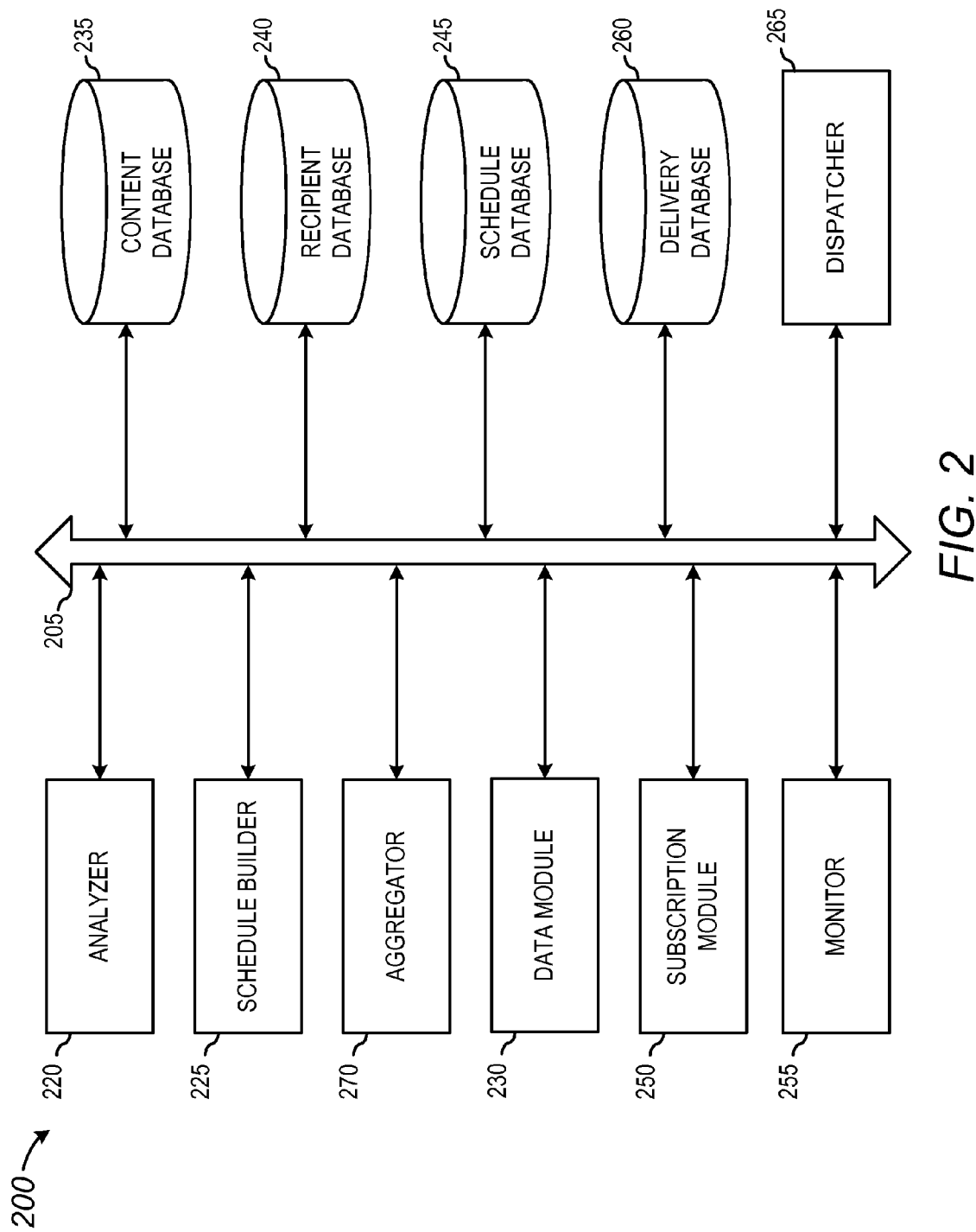
FIG. 2 is a block diagram illustrating a configuration of a content delivery system, according to some example embodiments.

FIG. 2 is a block diagram illustrating a configuration of a content delivery system 200, according to some example embodiments. The content delivery system 200 may include analyzer 220 to accept instructions and job specification data to create scheduling and aggregation directives for schedule building. The analyzer 220 may be coupled to a schedule builder 225 through a local computer bus 205. The schedule builder 225 may receive the scheduling and aggregation directives and produce scheduling and aggregation instructions as output. An aggregator 270 may be closely associated with the schedule builder 225 to provide the aggregation instructions from the corresponding aggregation directives. A data module 230 may be coupled to the analyzer 220 and provide content information from a content database 235 and recipient data and profile information from a recipient database 240. A schedule database 245 may receive the scheduling and aggregation instructions from the schedule builder 225 and retain the instructions for later dispatch to recipients 120.

A subscription module 250 may be coupled to the local computer bus 205 and receive subscription requests 355 from recipients 120. The subscription module 250 may forward the subscription requests 355 to the recipient database 240 for later retrieval by such system elements as the analyzer 220. A monitor 255 may also be coupled to the local computer bus 205 to receive content interaction data from the recipients 120. The monitoring of the content interaction data by the monitor 255 may provide feedback to system elements such as the analyzer 220 for the adjustment of the scheduling and delivery of content to the recipients 120. A dispatcher 265 may retrieve aggregation and scheduling information from the schedule database 245 and use that information to retrieve content from the content database 235 and transmit corresponding aggregations of content to the recipients 120. Subsequent to each delivery of content, the dispatcher 265 may store pertinent delivery information in the delivery database 260. The delivery information may later be retrieved from the delivery database 260 by the analyzer 220, for example, and used for updating further scheduling of the delivery of content to the recipients 120.

Figure 3:
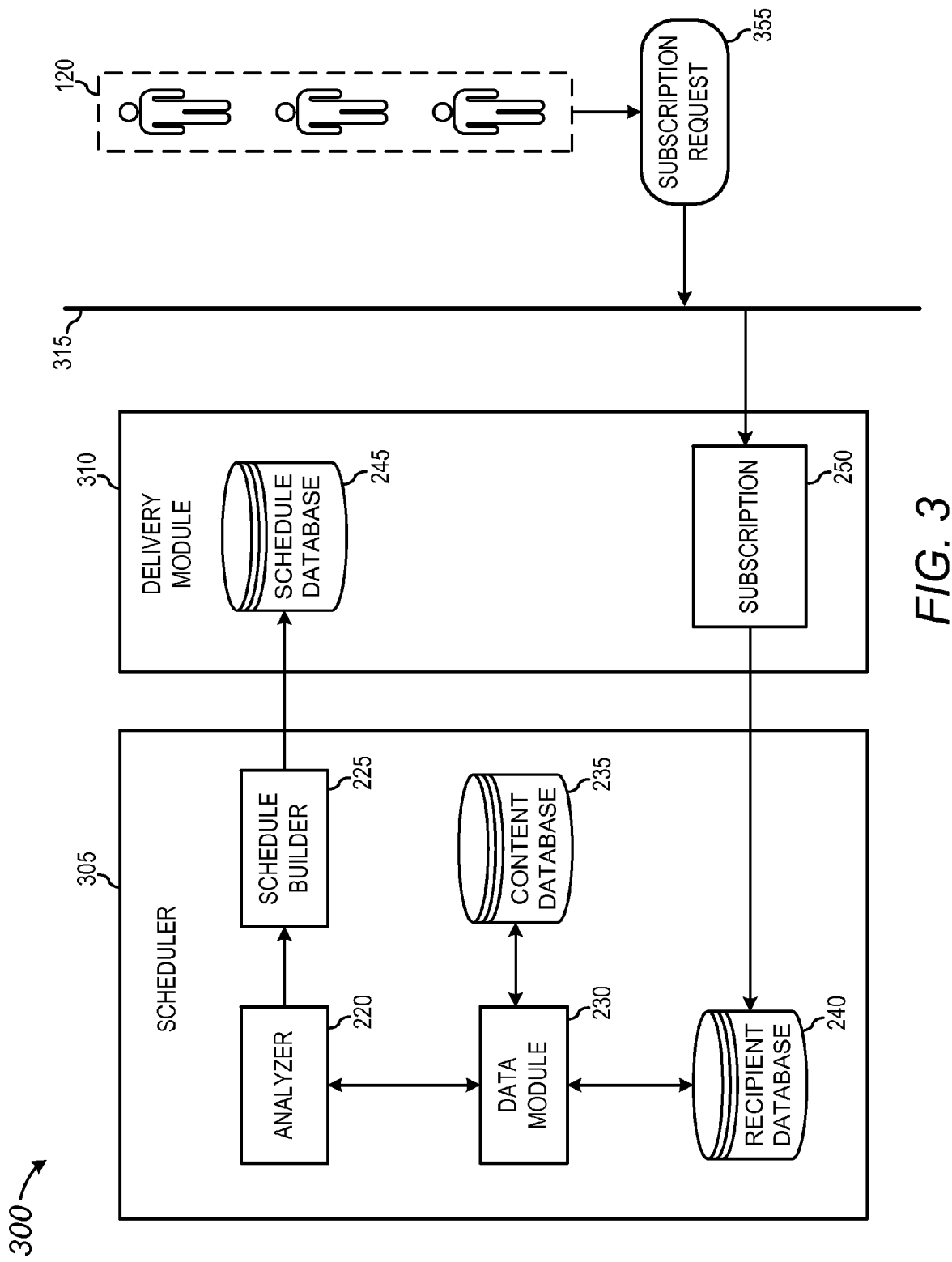
FIG. 3 is a block diagram illustrating a content delivery system, as may be used in some example embodiments

FIG. 3 is a block diagram illustrating a content delivery system 300, as may be used in some example embodiments. The content delivery system 300 includes a delivery scheduler 305 and a delivery module 310. The content delivery system 300 may be configured to operate in a networked environment by being communicatively coupled to any number of recipients 120 through a computer network 315. According to one example embodiment, the delivery scheduler 305 may be communicatively coupled through a network to the delivery module 310. The delivery scheduler 305 may be implemented as a portion of an offline server (not shown) and the delivery module 310 may be implemented as a portion of an online server (not shown) communicatively coupled to the computer network 315.

Historically, an online system has been tasked to accomplish the entire content assembly and content delivery process. According to this approach, a single online system receives large volumes of content, determines scheduling details, manages recipient information, and delivers the content to, what is usually, a large number of recipients 120. In online systems that are providing large amounts of content to large numbers of recipients 120, a correspondingly large number of digests and aggregations of content are assembled from voluminous amounts of input data and information. This information can be received by the online server as large volumes of data to be transmitted in short periods of time. The demand of the online system to both provide great amounts of content to recipients 120 while receiving similarly large amounts of content to aggregate and schedule may significantly affect performance of the system. Correspondingly, this performance impact can significantly affect whether the online server is able to accomplish both the task of content delivery and content scheduling within one server.

By creating an architecture including offline systems such as the delivery scheduler 305, which includes elements such as the content database 235, and recipient database 240; the demand on the online server is significantly reduced. At the same time, a greater amount of flexibility is achieved by having the offline system. For example, the creation of jobs and processes by the content producers 130 for managing the content database and for determining the associated decisions for scheduling, may be more readily handled through successive iterations of the analysis and scheduling processes. The successive iteration environment can provide build process feedback to the content producers 130 that is conducive to a heightened focus on the significant volumes of data. Also, the specialization of the offline system (also known as a backend system) to handle great volumes of data can greatly enhance productivity.

The offline system provides an environment that is suitable to development based primarily on data processing. This iterative process may be much more readily accomplished in the offline environment than in the online environment, if such a process could be accomplished in the online environment at all. The offline system may be tailored to supporting a data processing focus necessary to accommodate the large volumes of data inherent in the iterative build environment. Having data processing oriented systems situated in the offline environment and delivery oriented systems situated in the online environment allows for a specialization of focus by developers in the respective environments. In an offline environment, content producers can focus on the content database and the recipient database in a highly-leveraged data-oriented paradigm. At the same time, delivery and final scheduling specialists may focus on dispatching and delivery essentials in the online environment.

The large amounts of data associated with the content database 235 may directly indicate the number of decisions and calculations that are to be made on that data in order to determine delivery and scheduling. This volume a calculation may be optimally handled by batch processing. The batch processes may analyze the delivery specification and recipient information and can make decisions on what scheduling output data can be produced. Content can be placed in the content database before batch processing is undertaken by the system. Output data, such as a schedule or scheduling information, may be transmitted to a distribution agent such as the dispatcher 265 in the online system, such as the delivery module 310, for example. According to one example embodiment, the large amounts of data output from the content database 235 can be provided to the dispatcher 265 in a single read-only data store.

The delivery scheduler 305 may include the analyzer 220 (FIG. 2) communicatively coupled to the schedule builder 225. The data module 230 may be communicatively coupled to the content database 235, the recipient database 240, and the analyzer 220 to provide data from the content database 235 and the recipient database 240 to the analyzer 220. Content from the content database 235 and recipient data from the recipient database 240 may be provided by the data module 230 to the analyzer 220 to be combined and processed as scheduling input to the schedule builder 225, for example. The delivery module 310 may include the schedule database 245 communicatively coupled to the schedule builder 225 and the subscription module 250. The subscription module 250 may receive a subscription request 355 from the recipients 120 through the computer network 315. The subscription request 355 may in turn be transmitted to the recipient database 240 for storage and possible later retrieval by the analyzer 220, for example.

The delivery system can be supplied with an extensive set of recipients 120 whose collective interests may match a broad range of expected content to be created by content producers. Recipient information can reside in the recipient database 240 and may include recipient profile information as well as subscription information from the subscription request 355 of the recipient 120. Each recipient 120, on becoming a member of the site supplies profile indicators to their profile in the recipient database 240. Each recipient profile can include recipient-specified data such as delivery settings for receiving specified types of content. Each profile comes initially with a set of default values for delivery, such as delivery scheduling by type of content and general calendar information that may be utilized for scheduling deliveries at a default locale. Each recipient 120 can update the delivery settings at any time. The recipient's update of a particular profile indicator will override the default and the next pass of the delivery scheduler 305 will take these most recent settings by the recipient 120 into account for scheduling delivery of further content.

According to some example embodiments, delivery settings and indicators can include content types with corresponding interest levels, delivery schedule input by content type or designator, a device designator (device type), device identifier (e.g., registration of particular devices, such as smart phone or tablet), and a location designation. For example, a recipient 120 may want a particular type of information at a particular location, such as sporting news when they are attending a ballgame at a stadium. A smart phone may be registered in the recipient's profile information and be capable of supporting geolocation services that are able to trigger receipt of the sporting news when the stadium location is detected by the smart phone and provided to the content delivery system 300. Recipient subscriptions may be stored in the recipient database 240 after being received by the subscription module 250 from the recipients 120.

Figure 4:
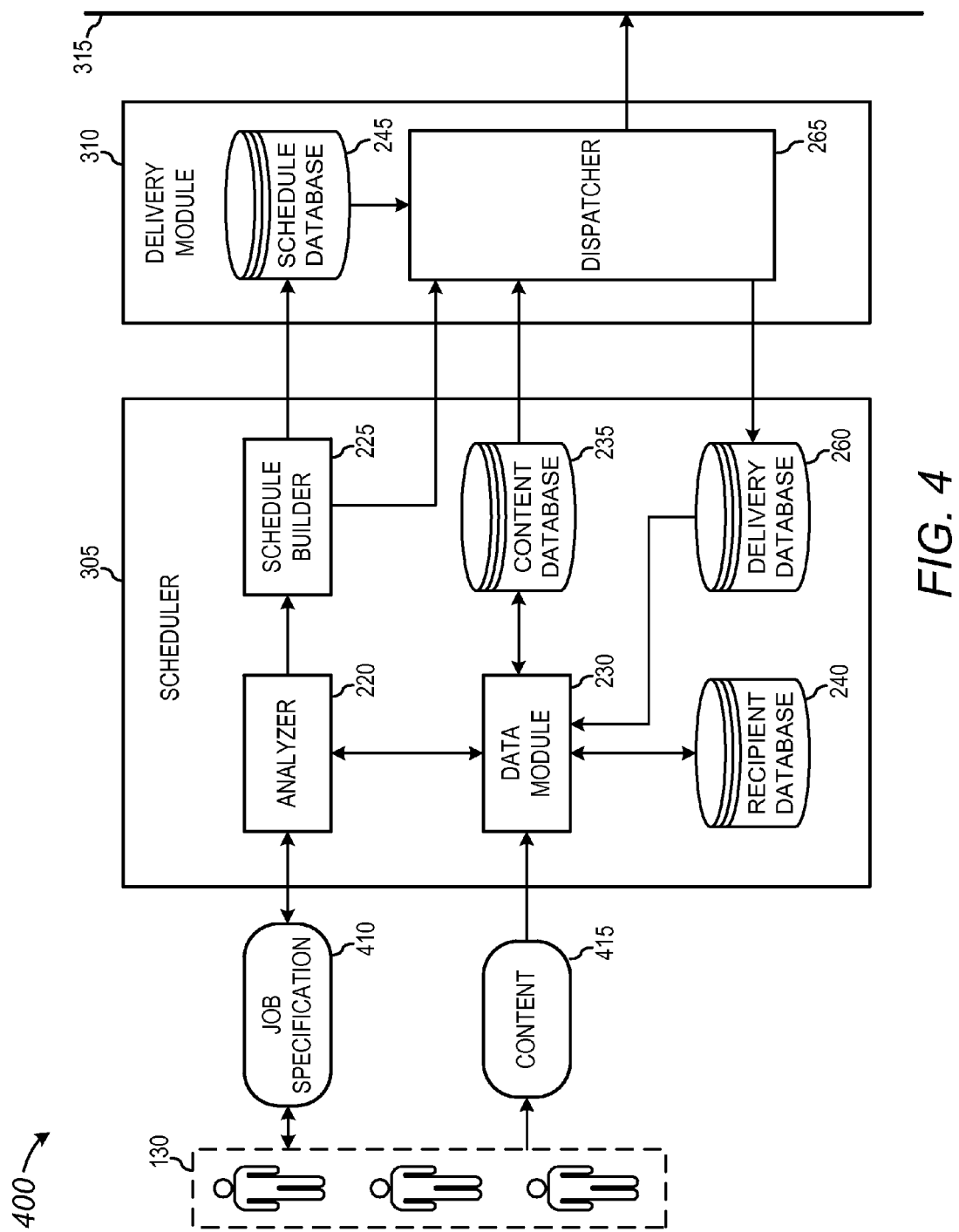
FIG. 4 is a block diagram illustrating the content delivery system configured to receive job specifications and content, according to some example embodiments.

FIG. 4 is a block diagram illustrating the content delivery system 300 configured to receive job specifications and content, according to some example embodiments. The content delivery system 300 (FIG. 3) can be configured such that the delivery scheduler 305 may be supplied with content 415 by content producers 130. Content producers 130 may also be referred to as content developers or product developers, according to some example embodiments. The content producer 405 is responsible for the development and creation of content 415. The content producer 405 may also create a delivery specification for the content 415. The delivery specification can include recipient designator (list of recipients 120 by type or by name), content view formatting, an aggregation specification (standalone, digest, combined with other digests and standalone content), specification of a particular level of content interaction from target recipients 120 indicating a good match to the content 415 (level of content interaction with specified type of content), monitoring cycle specification (number of delivery cycles included in a content interaction monitoring cycle). The content 415 may be targeted for the body of email targeted to a particular set of recipients 120. The content 415 may include information about articles or include links to further content 415.

A product developer may be a person or team creating content 415 around a particular theme or item of interest (i.e., the product). The product developer may perform the functions of the content producer 405 as well as have further responsibilities for the targeted generation of content 415 around a product. For the purposes of this specification, the concept of a product may refer to the assembly of content 415 and delivery of that content 415 to a particular set of recipients 120, where the content 415 is centered around a particular interest of the recipients 120. According to some example embodiments, a product may be associated with a social network, a special interest group, a hobby, a sport, politics, or news relating to a particular event, for example. The product developer may set up the logic used by the analyzer, for example to determine what content 415 is to be gathered for delivery, when the content 415 is to be sent, and to whom the content 415 is sent.

The product developer may not need to know all the details about delivery, scheduling, and the recipients 120. The product developer may submit a fundamental job description that will serve as initial guideline information that will serve as a basis for the system to operate from. The system will automate and adjust the delivery schedule as part of an ongoing process. This process can be based on feedback from the recipients 120 and the viewing or reading information that can be obtained from the recipients 120. In this way, the product developer need not be involved in ongoing scheduling details for content delivery either for the large volumes of content 415 or the large number of content recipients 120. For example, in some example embodiments the product developer may submit content specification, delivery specification, aggregation specification, and target recipients 120. For instance, recipients 120 may be targeted by activities they relate to or participate in as well as their level of content interaction with certain types of content 415.

Details relating to the delivery and scheduling of particular content 415 may be provided to the content delivery system 300 within a job specification 410 provided by the content producers 130. The data module 230 can receive the content 415 and either store the content 415 in the content database 235 or provide the content 415 to the analyzer 220, for example. The analyzer 220 may utilize data within the job specification 410 as instructions to guide analysis of the content 415 and create scheduling input to the schedule builder 225. The schedule builder 225 may provide an initial schedule to the schedule database 245 in the delivery module 310. Additionally, the schedule builder 225 may send scheduling related indicators to the dispatcher 265 to indicate to the dispatcher 265 that the aggregation specification resides in the schedule database 245.

According to some example embodiments, a dispatcher 265 can be communicatively coupled to the computer network 315 to send the content 415 to recipients 120 (not shown). The dispatcher may receive scheduling information from the schedule builder 225 and in the alternative, from the schedule database 245 and retrieve content 415 from the content database 235 that is to be sent to the recipients 120.

The transmission of the content 415 and certain details of the transmission may be logged in the delivery database 260.

Figure 5:
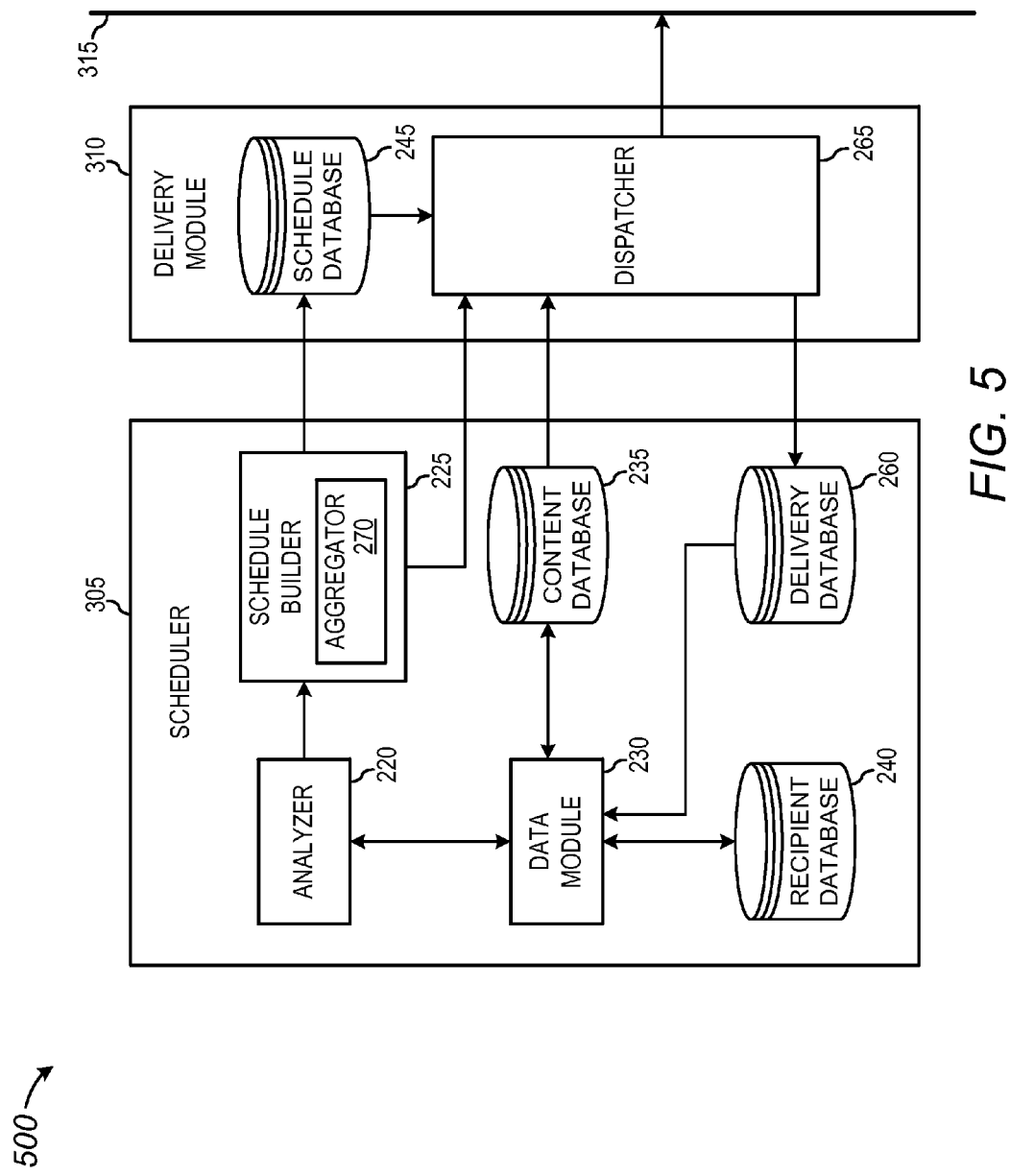
FIG. 5 is a block diagram illustrating the content delivery system configured to dispatch content over a computer network, as may be used in example embodiments.

FIG. 5 is a block diagram illustrating the content delivery system 300 configured to dispatch content 415 over a computer network, as may be used in example embodiments. Here, the content delivery system 300 (FIG. 3) is shown in a configuration is similar to that of FIG. 4. Within the delivery scheduler 305 the schedule builder 225 is shown to include the aggregator 270. The aggregator 270 receives input from the schedule builder 225 and the analyzer 220 that specifies a target aggregation of content 415. The aggregator 270 may produce a aggregation specification (not shown) that can be transmitted to the schedule database 245 within the delivery module 310 for eventual use by the dispatcher 265 in collecting and assembling the target aggregation of content 415 which, the dispatcher 265 may later transmit to the recipients 120 (not shown).

Figure 6:
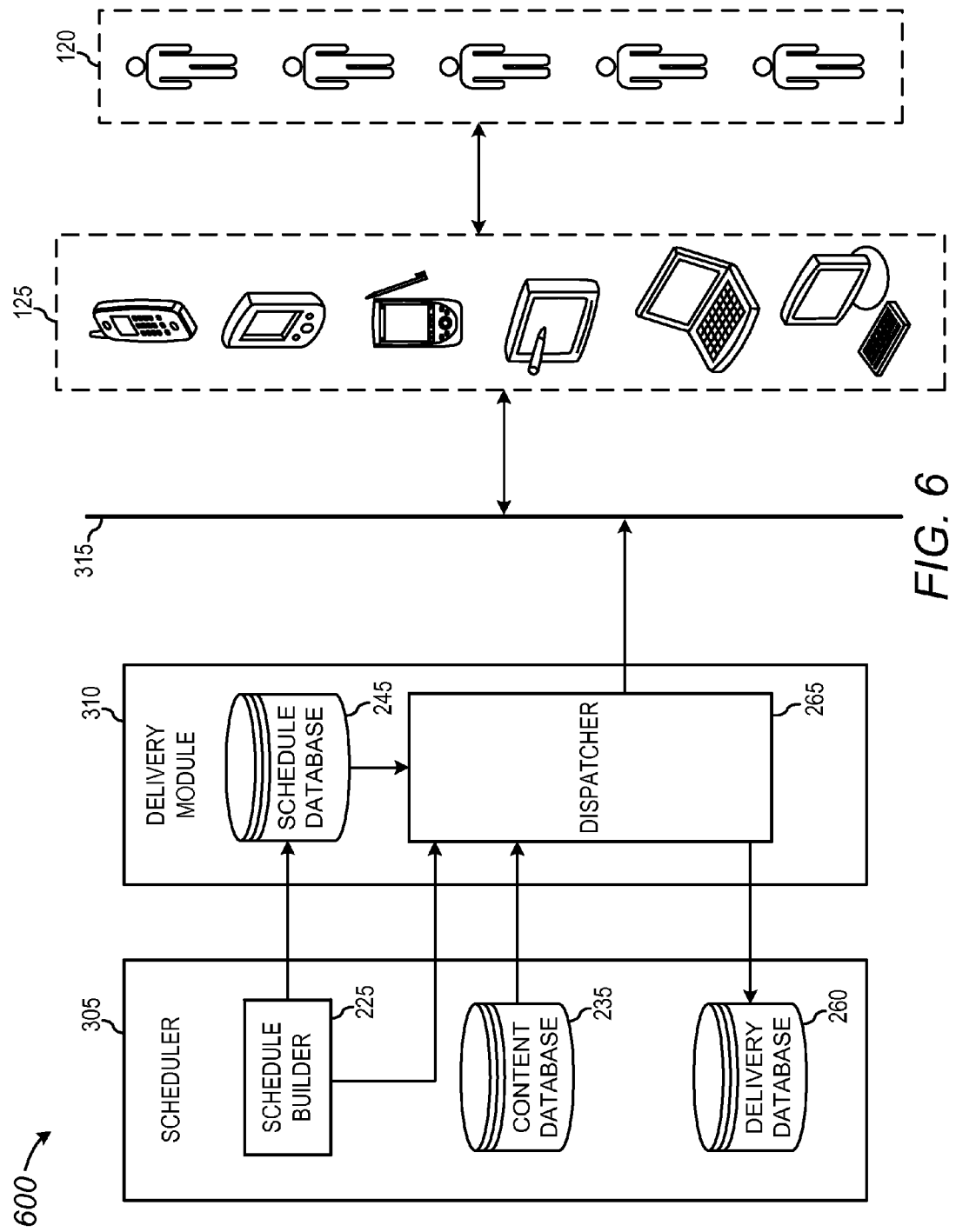
FIG. 6 is a block diagram illustrating the content delivery system configured to dispatch content to recipients through a computer network, according to some example embodiments.

FIG. 6 is a block diagram illustrating the content delivery system 300 configured to dispatch content 415 to recipients 120 through a computer network, according to some example embodiments. Here, the delivery scheduler 305 and the delivery module 310 of the content delivery system 300 (FIG. 3) are shown to be configured to be communicatively coupled through the computer network 315 to a set of devices 125 as may be used by the recipients 120, according to one example embodiment. The devices 125 may correspond to many different types of devices that may be, for example, a cell phone, a smart phone, a personal data assistant (PDA), a tablet, a notebook computer, or a desktop computer to name but a few of the possible personal electronic devices usable by the recipients 120 to establish communication with the content delivery system 300.

The devices 125 may be associated with a location, a type of content consumption (tablet, laptop, desktop), a time of day, calendar entries, or a personal schedule. For example, a smart phone may include geolocation services that allow the recipients 120 location to be used in determining what content 415 to be delivered, or which schedule to deliver the content 415 by, or both. Small portable or mobile devices may be suitable for relatively casual content 415 and important notifications. On the other hand, a tablet may be more suited for consumption of more involved content 415 such as articles or in depth news reporting. According to a further example embodiment, a particular recipient 120, being an avid sports fan, may regularly make use of a small-format tablet on weekends at professional sporting venues to consume sporting related content 415. The content delivery system 300 may make use of this information to schedule delivery of sporting news coverage and box scores for local teams on weekends when the small-format tablet is in use by the recipient 120 and located in proximity to a professional sports arena or stadium.

The content delivery system 300 and the devices 125 may be communicatively coupled through the Internet or web through wired and wireless connections in communication frameworks such as Hypertext Transfer Protocol (HTTP), Extensible Markup Language (XML), Transmission Control Protocol (TCP), or Internet Protocol (IP) to name a few Internet protocol examples that may be utilized in various example embodiments.

Figure 7:
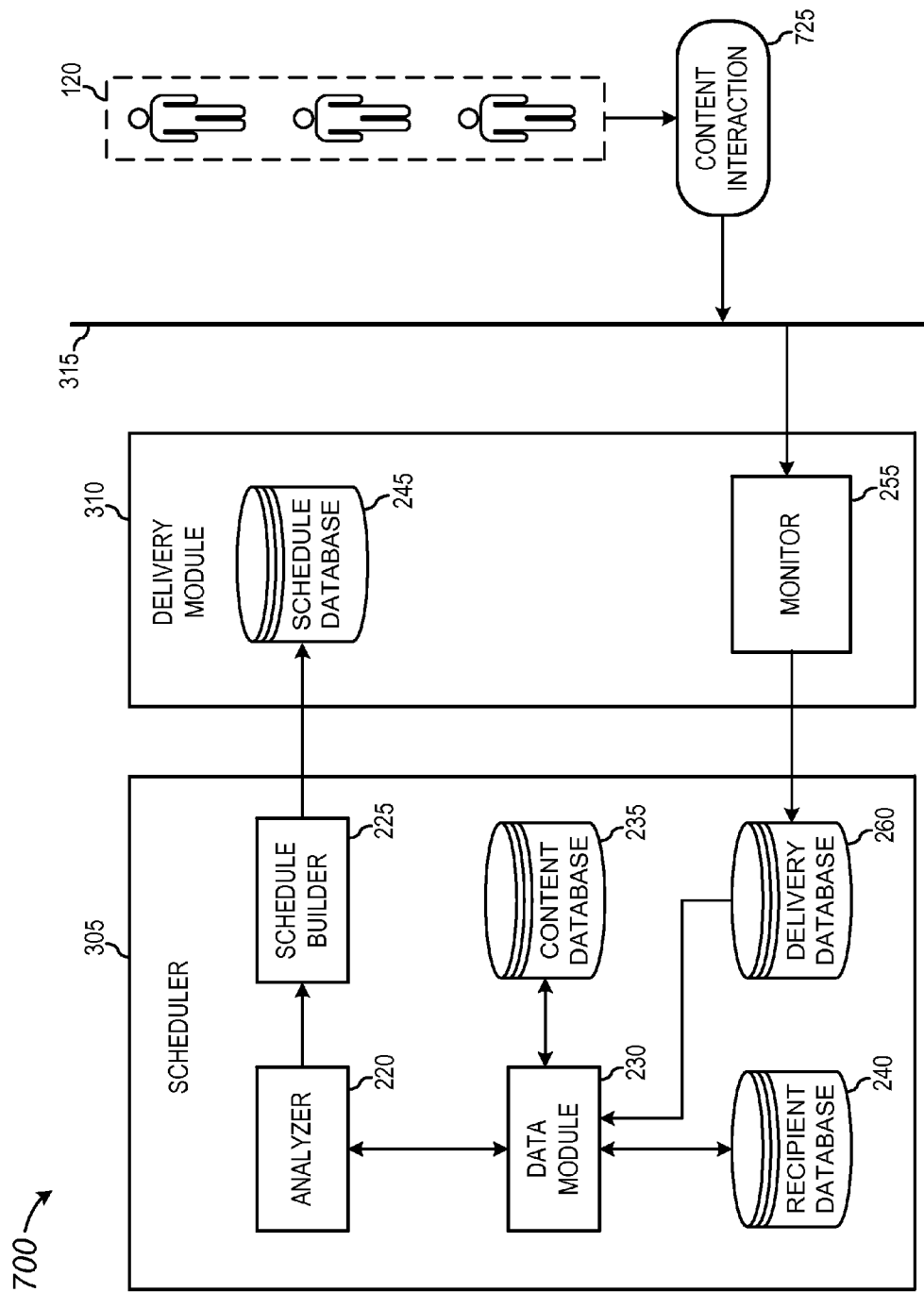
FIG. 7 is a block diagram illustrating the content delivery system configured to monitor content interaction by recipients, as may be used in example embodiments.

FIG. 7 is a block diagram illustrating the content delivery system 300 configured to monitor content interaction by recipients 120, as may be used in example embodiments. The monitor 255 may reside in the delivery module 310 and be communicatively coupled to the computer network 315 to receive content interaction 725 from the recipients 120. The content interaction 725 may include clicks on email, email viewing events (opening an interface to a particular email provider), page views at a related website, selection of content for reading (by identifier and designator), time/date stamp of reading, reading location, reading device identifier, level of content interaction (frequency) by designator. For example the level of content interaction for the recipient 120 may correspond to a particular type of content and the frequency of interaction with that content type over a specified period of time. For example, a monitoring cycle specification may designate the number of delivery cycles included in a content interaction monitoring cycle, where the monitoring cycle measures the frequency of interaction with a content type over a specified interaction sample (not shown).

The delivery database 260 may receive the content interaction 725 from the monitor 255. The delivery database 260 may also include a history of content interaction 725 by recipients 120. In accord with certain example embodiments, the recipient database 240 may receive at least a portion of the history of the content interaction 725 by the recipients 120. The history of content interaction 725 can be used in determining optimal scheduling of the delivery of further content. Content interaction 725 is kept on a per-recipient basis as well as by content designator. Content interaction 725 may be tracked along several different attributes or aspects of the content 415. According to certain example embodiments, a news article on a sporting event may be tracked by news and sports. Content interaction 725 by the recipient 120 may be monitored, stored, and retrieved by both news and sports. In this way, the analyzer 220 and the schedule builder 225 can retrieve a recipient's 120 content interactions 725, from any of several different search criteria, and use the information to optimize generation of a delivery schedule. For instance, according to certain example embodiments, the content interaction 725 of the recipient 120 with particular types of content and specific deliveries of each type of content may be tracked. Content interaction 725 corresponding to a group of recipients 120 may also be tracked according to particular types of content. Accordingly, the content interaction 725 corresponding to a group of sports fans may be tracked and used as feedback for producing further content. Additionally, at least a portion of the same content interaction 725 may be used to determine the recipient interest level for news by one or more recipients 120. Distinguishing compound characteristics and aspects of the content 415 allows the monitoring by the monitor 255 of the content interaction 725 for one email to be used as feedback and multiple different ways.

The particular recipient interaction to particular content or types of content may be used to determine the scheduling of further content of the same types or to determine offerings of further content of different content types. For example, a content producer 130 may want to offer different content types for diversity or contrast compared to a general trend in delivered content 415. Offering a variety of content 415 may allow the content producers 130 to maintain the overall interest level of the recipient 120. The trends in the content interaction history may provide feedback to content producers as well as the system to form the basis of adjustments to the delivery or content to any number of recipients 120. For example, diminishing rates of content interaction by the recipient 120 for global news updates may indicate a lack of interest on the part of the recipient 120 for that type of content. This information may be used by the content delivery system 300 to adjust the delivery schedule of that type of content or to pursue delivery of an alternative type of content to the recipient 120.

The history of the content interaction 725 may be stored as a content interaction history data structure (not shown), or simply a "content interaction history," within either the delivery database 260 or the recipient database 240, or both. A reference to the history of the content interaction 725 can be synonymous to a reference to the content interaction history. According to one example embodiment the complete content interaction history may be stored in the delivery database 260 and a portion of the content interaction history can be stored in the recipient database 240. For example, the content interaction 725 may include clicks on email, email viewing events (opening an interface to a particular email provider), page views at a related website, selection of content (by identifier and designator) for reading, time/date stamp of reading, reading location, reading device identifier, level of content interaction (frequency) by designator. For example the level of content interaction for the recipient 120 may correspond to a particular type of content and be measured as the frequency of interaction with that content type over a specified period of time (sample period).

The group of recipients 120 may be composed of recipients 120 having a common interest. In groups, content may be generated by the users and members of the group where the sharing of information about the common interest may become the content in an email channel. This form of intragroup communication may form a substantial amount of content of a similar type.

Digests are aggregations, assemblies, or compendiums of various content that typically is assembled for a period of time or across a particular type of interest expected for prospective recipients 120. For example, a network's update digest (relating to a recipient's 120 network of connections) may be an email update once per week with announcements about general news regarding connections (other users of the network) in the recipient's network, and includes other content shared by these network connections. The digest may include network changes that cover a prior week, such as new connections joining the network of a recipient 120. It may also include other information, such as a listing of profile changes by network members, postings of shares by members of the recipient's network. It may also include information related to these network changes, such as job recommendations for the recipient 120 based on the job changes of connections within the recipient's network.

Digests may also be assembled for groups (special interest groups) that the recipient 120 belongs to. A group digest can be a digest relating to a particular group where the time of delivery and delivery frequency of the digest is determined by the history of content interaction on a per-recipient basis. Group digests may be distributed individually or combined with digests from other groups for an aggregated delivery. Digests can be assembled for a particular (target) company and have content that presents items of interest going on in the company (that you are employed by, for example) and may include items such as job postings in the company.

An email campaign may be iterations of the process of delivering email, levels of content interaction by recipients 120 measured, and adjustments to successive email deliveries made until a targeted level of content interaction by the recipients 120 is attained.

The type of content placed in the content database 235 may include the raw content 415, as well as the delivery specification, the level of content interaction (expected of target recipients 120). The level of content interaction for a given recipient 120 is initially empty (i.e., no value is present as a default). The level of content interaction is updated as the recipient 120 opens and reads a delivered email including the particular content triggering the measurement of the interaction.

Once content 415, job specifications 410, and data pertaining to recipients 120 has been entered into the content delivery system 300, the delivery scheduler 305 can initiate a schedule build process. The schedule build process is a set of checks and comparisons between a delivery specification and content being considered for delivery to the recipient 120. The schedule build process accumulates matches between the delivery specification and respective potential content 415 items, so that an appropriate delivery schedule can be created. According to some example embodiments, scheduling can be done by the delivery scheduler 305 and delivery can be done by the delivery module 310.

Conforming to example embodiments, the delivery scheduler 305 may interrogate the recipient database 240. The delivery scheduler 305 may receive content 415 from the content producer 405. Such content 415 may be accompanied by the job specification 410. The job specification 410 can include information that accompanies the content 415 and helps to determine how that content should be scheduled for delivery and which recipients 120 are best suited to receive that content 415. The job specification can include a recipient designator, a validity period, and an aggregation specification. Prior to an interrogation of the recipient database 240, the contents of the job specification 410 may be made available to the analyzer 220 and the schedule builder 225. Within the job specification 410, the validity period, for example, may be a time period or a final date up to which the content is valid. The validity period takes into account the timeliness of the content and the consideration that after the specified amount of time the content may not be meaningful to the recipient 120.

Once the contents of the job specification 410 have been assessed, the delivery scheduler 305 can interrogate the recipient specification to identify type of recipient 120, and their behavior with certain types of content, such as their content interaction 725. The delivery scheduler 305 uses the content recipient type (recipient type targeted by the content and job specification 410) to compare with the recipient's 120 recipient type. If there is a match between the two recipient types, the schedule build continues.

The delivery scheduler 305, and in particular the analyzer 220, for example, may match the level of content interaction of prospective recipients 120 with similar-type content to the type of content being scheduled. Other factors that may be used to match content and recipients 120 can be delivery settings, device type, device identifier, and location. Generally, any particular type of designator or specification included in the job specification 410 will trigger the analyzer 220 or the schedule builder 225, or both, to query the appropriate database of content, recipient, and delivery information to form a match in creating a delivery schedule for the input content 415.

The delivery scheduler 305 can also take into account the total volume of content delivered to the recipient 120. The delivery scheduler 305 may make use of the data module 230 to query the delivery database 260 and the recipient database 240 to determine both the number of content items delivered to the recipient 120 and to determine an amount of time over which content items are being delivered. The historical number of content items delivered over a particular window of time may give a content delivery density quotient (delivery density quotient). Various types of content may be used in calculating the delivery density quotient. Content may be selected by type in order to calculate the delivery density quotient so that the quotient measures the delivery density corresponding to a particular type of content. Accordingly, the amount of content 415 delivered to the recipient 120 may be managed according to each content type.

An initial default value for the content delivery density quotient for recipients 120 may be set in the recipient database 240 to a value determined by a general accumulation of experience with delivery frequency and by long-term monitoring. The delivery experience is accumulated across all the recipients 120 for extended periods of time and is based on data queried from the recipient database 240 and the delivery database 260. In keeping with some example embodiments, the delivery scheduler 305 compares a prospective delivery density quotient determined by the total volume of content being scheduled for a near-term delivery and the window of time over which that content is being scheduled for delivery. The prospective delivery density quotient may be compared with the system default value and if the prospective delivery density quotient is greater than the system default, the system may decrease the total amount of content to be delivered. After a sufficient number of delivery cycles have been completed for a recipient 120, the prospective delivery density quotient may be compared with the current delivery density quotient for the recipient 120.

When the delivery scheduler 305 determines according to a delivery density quotient analysis that the total amount of content to be delivered must be reduced, certain content must be removed from consideration for delivery. To determine what content may be suspended from near-term delivery, consideration may be given to the type of content a recipient 120 may have expressed interest in receiving according to corresponding settings in their recipient profile. Further content for consideration of suspension from near-term delivery may be determined by looking at the historical level of content interaction 725 by content type which has been expressed by the prospective recipient 120. Data relating to the types of content having a low level of content interaction 725 by the recipient 120, may be compared with the content type of content being considered for delivery. When the content type of content being considered for delivery matches the content type of the content having the low level of content interaction 725, that content may be withdrawn from the near-term delivery. Content that may be considered for withdrawal from delivery without particular scrutiny by the delivery scheduler 305 to historical levels of content interaction, may be marketing content, for example.

With a match of content type with recipient type, the delivery scheduler 305 queries the delivery settings schedule in the prospective recipient's profile information. Any recipient-specified scheduling designators provided by the recipient 120 override a corresponding default setting. Recipient-specified scheduling designators may override any scheduling designators derived by the delivery scheduler 305. Any scheduling designators derived by the delivery scheduler 305 may override a default setting of corresponding scheduling designators in a recipient's 120 profile information.

Content interaction 725 measured by the monitor 255 and entered into the delivery database 260 may be stored along with a recipient ID such that queries into the recipient database 240 can interrelate to the delivery information in the delivery database 260.

The recipient 120 may set a high delivery frequency for delivery of a given type of content. For example, the recipient 120 may set a daily delivery for a particular group digest. When the delivery scheduler 305, in reviewing the history portion of the recipient database 240, discovers that the level of content interaction for the group digest has been low for the monitoring period, the delivery scheduler 305 may initiate a message and further content to the recipient 120 suggesting that the delivery settings for this group digests be reviewed since apparently the recipient's interest level is low.

The delivery scheduler 305 queries each content item in the content database 235 to assess the content validity. The content validity is the time or time window that the validity of the content expires, is lowered, or leads to discarding the content. The delivery scheduler 305 also queries the aggregation specification and determines how the content is specified to be delivered (aggregated) in an email with further content (if any).

The schedule builder 225 may call the aggregator 270 to create a final email specification including all content that may be combined according to the delivery specification. The delivery specification may be the information provided to the dispatcher 265 so that the complete set of content may be retrieved by the dispatcher 265 from the content database 235 and formatted into the final email. Aggregation may be initially considered by the content delivery system 300 on a per-recipient basis, where the content interaction level is monitored to assess how the indicated interest level of the recipient 120 may be affected by various aggregation alternatives, such as by groups or by interests. Following experiences with aggregation on the per-recipient level, aggregation on a group level may be considered and monitored in a fashion similar to that discussed for the per-recipient aggregation. One aspect of the interest level relative to changes in aggregation between successive email deliveries, is a possible decrease in the level of content interaction by the recipient 120 across a succession of emails having significant changes in content aggregation from delivery to delivery.

The call to the aggregator 270 by the schedule builder 225 includes the content identifier and may include a pointer to the aggregation specification portion of the content data structure. The aggregator 270 can build the aggregations of digests and may consider the aggregation specification when supplied. When a delivery configuration is complete, the content, any digest corresponding to the content, further specified digests, and any additional single content may be amassed in one or more emails.

Delivery considerations may be kept in conjunction with the aggregation specification. Further processes can be instructed to schedule email delivery to recipients 120 designated in the recipient database 240, such that the deliveries are scheduled across the recipients 120 over a period of time, such as over days or weeks, for example. A history may be kept (e.g., for 90 days) so that duplicate deliveries may be avoided. Even further processes may make sure that similar types of email are not received by the same recipient 120 on the same day. These processes ensure that delivery of email that may have a similar type of content is spread out.

The dispatcher 265 may have access to email templates that get populated by the dispatcher 265 with information from the schedule database 245 and content from the content database 235. The schedule builder 225 transfers data (not an email) to the schedule database 245 in the delivery module 310. The data transferred contains a template identifier that indicates the template to be populated by the dispatcher 265 and used to build a final email. The data sent by the schedule builder 225 populates the specified email template. The template may reference data types to populate particular elements of the template fields. The data sent contains key-value data structure and trees of data structure, that match the types of data in the template. Email is a container of content 415, constructed in the dispatcher 265, and sent via the computer network 315 to recipients 120. The data and the template will match in regard to data structure. The content producer 405 may create both the template as well as provide the data content. Data provided is built up by a "data job", which may be included in the job specification 410, for example.

The delivery scheduler 305 can compare the content interaction specification of the content with the content interaction history of the recipient 120. For instance, if the content interaction specification designates a level of content interaction that matches the level of content interaction in the recipient's 120 history, then there is a match of the content under consideration with the recipient 120. The delivery scheduler 305 uses the level of content interaction from the delivery specification as a search specification within the history portion of the perspective recipient's information in the recipient database 240. The same quantity may be used as the threshold used in comparison with the recipient's 120 level of content interaction with the same content type matched in the earlier portion of the schedule build. When there is a match in the level of content interaction, the schedule build continues by determining the delivery schedule.

If the recipient 120 is historically receiving a large volume of content and has a corresponding history of high interest in that content expressed by a high level of content interaction 725, the delivery moderator may consider continuing with the scheduling of delivery of content at a larger volume and continue monitoring the level of interest expressed by the recipient 120 at the new volume of content delivery.

When the complement is true, when the recipient 120 is regularly receiving a large volume of content and the level of interest by the recipient 120 in that content is low (as determined by the level of content interaction 725), particular content may be suspended from a given delivery and may be held for consideration for delivery in a subsequent delivery. Withdrawal of a particular piece of content does not mean that it is discarded completely from consideration for delivery to the recipient 120.

Content that may not be considered for withdrawal from a near-term delivery, may be content deemed to be of general or significant importance. The level of importance is such that the significant content should be delivered regardless of the total amount of content being delivered. The significant content may not be considered for withdrawal from the near-term delivery. Significant content may be, for example, member-to-member messages, invitations, or certain notifications.

Consistent with one example embodiment, moderating the total volume of content the recipient 120 receives allows a large number of content producers, perhaps across several development groups or functions within a business, to generate an appropriate amount of content for their group. Yet, at the same time, a central corporate-wide method of modulating the total volume of content delivered to any one recipient 120 may be maintained.

After delivery of content corresponding to the delivery process has progressed through several delivery cycles of the email to the recipient 120, the level of content interaction is reviewed and compared with the level of content interaction provided in the delivery specification. If the level of content interaction with the further content decreases below the level in the delivery specification, the delivery frequency will be lowered and the level of content interaction will continue to be monitored. A decrease in the level of content interaction demonstrates a lack of interest on the part of the recipient 120 for the content or the amount of that type of content. The delivery frequency is lowered with the expectation that fewer deliveries of the content may better match the interest level of the recipient 120. The lowering of the delivery frequency is referred to as "adaptive delivery" which is the process of matching the delivery frequency of content to the interest level of the recipient 120.

When the level of content interaction 725 by the recipient 120 drops in general, and in particular when content interaction 725 is low enough to trigger the lowering of the delivery frequency, a notification may be sent to the content producers 130. The content delivery system 300 can send the notification of the content producers 130 to provide feedback on the content interaction 725 and the related interest level by the recipient 120. The feedback notification corresponds with the most recent content 415 the content producers 130 have provided. The feedback notification may be used by the content producers 130 to modify the type of content, the volume of content, or the schedule delivery of content to prospectively better match the interest level of the recipient 120 in further deliveries of content 415. In this way, the content producers receive what may be valuable input regarding the content 415 right after the content interaction 725 is made available to the monitor 255. The content delivery system 300 may transmit notifications to provide feedback to the content producers 130 when the level of content interaction 725 increases as well as decreases. Providing recipient interest level feedback notifications when a lowering interest level is indicated by lowering levels of content interaction 725 can be considered the default notification trigger by the system and notifications of increasing recipient's interest level may be an optional notification trigger.

After the decision is made to adapt the delivery frequency value to the interest level of the recipient 120, the delivery system can forward the lowered delivery frequency value to the dispatcher 265 for subsequent deliveries to the recipient 120. After delivery of further content for the number of delivery cycles specified in the monitoring cycle specification, the delivery frequency is again considered for reduction in an effort to match the interest level of the recipient 120. Prior to each reduction of the delivery frequency, the newly lowered delivery frequency is compared with a minimum threshold of delivery frequency specified for the email deliveries of further content. When the minimum threshold of delivery frequency is exceeded by (i.e., is lower than) the newly lowered delivery frequency, delivery of the content is halted, the recipient 120 is unsubscribed from this content type, and the schedule for this content type to this recipient 120 may be placed in a suspended state for further consideration in the future.

According to an example embodiment, when content in the form of group digests are being delivered to a recipient 120 on a daily basis, and it is determined that they are not being read on a regular basis, the delivery frequency for the group digests may be lowered from daily to weekly and the monitoring process described above is initiated. If after the specified content interaction monitoring period elapses and the level of interest by the recipient 120 continues to be low (e.g., their level of content interaction with the weekly group digest is still low compared to the threshold), the recipient 120 is unsubscribed from the group digest.

On the other hand, when delivery has progressed through several delivery cycles and the level of content interaction by the recipient 120 is at or above the level of content interaction specified in the delivery specification, the delivery frequency can be increased, the level of content interaction with the content is updated in the history portion of the recipient's information (e.g., recipient database entry), and the level of content interaction can continue to be monitored. The delivery frequency and corresponding level of content interaction by the recipient 120 are reviewed after the number of delivery cycles to be monitored has elapsed. When the present level of content interaction by the recipient 120 is maintained at or above the most recently updated level of content interaction (in the recipient database 240), the delivery frequency is increased. The progression of increasing delivery frequency, monitoring, and comparing is continued until the level of content interaction no longer increases. If continued monitoring of the recipient's level of content interaction remains the same, the delivery frequency is maintained at the present value. If the delivery frequency is determined to decrease through the monitoring process, the delivery frequency can be lowered and the monitoring process continued similarly to the delivery frequency lowering process described above.

The dispatcher 265 populates and maintains the delivery database 260 by keeping track of which recipient 120 is receiving what type of content with what type of schedule and frequency. This data is collectively known as a recipient subscription. The dispatcher 265 is responsible for maintaining source data for the recipient subscriptions in the delivery database 260 and for providing copies of the recipient subscriptions to the recipient database 260 in the offline system. The scheduling details kept in the recipient database 260 can include the more immediate adjustments to scheduling and updates that keep track of device type, location, and daily schedule considerations.

The dispatcher 265 may also be responsible for the online interactions with the recipients 120, including the generation of email to the recipient 120 which includes the content generated and specified in the offline server and the content database 235. The dispatcher 265 can receive client requests, gathered data, create and format the actual email page, including providing the content arranged by the aggregation specification, and resolve the final scheduling of delivery of the email to the recipient 120. This final scheduling may take into account calendar particulars.

For instance, calendar entries may guide the schedule builder 225 for determining content delivery. The recipient 120 may provide preferences in their profile entry when they initiate a subscription. Profile information including calendar data is retained in the recipient database 240. Besides general calendar information, such as the day of the week, holidays, workdays (tailored by preferences in the recipient's 120 profile entry), the calendar information may also include scheduling of vacations, workplace closures (e.g., holiday related), and seasonal schedule fluctuations or shutdowns.

Other delivery scheduling factors may be weather, previous behavior by the recipient 120 (e.g., reading, browsing, selected embedded links), social network connections (published preferences, stated interests, contacts, networks, interest groups, and subscriptions to SIGs, hobbies, sports). For example, the recipient's 120 connection to a social network may provide a connection to further data at the social networking site that reveals interests and activities that may determine the type of content to be scheduled and delivered to the recipient 120.

The delivery schedule may take into account the recipient's 120 job and career information such as professional networks, connections, published preferences, business profile content, job type, position, title, company name, education, school, location, for example. The delivery schedule may also take into account the delivery specification including the content type identifier, the aggregation specification, and content view formatting.

The dispatcher 265 can review the scheduling information associated with content and determine when to deliver the content and what other information (further digests) would be included in the delivery. With the target type of recipient and target type of device the included in the delivery determination. According to some example embodiments, the analyzer 220 and the schedule builder 225 may query delivery information that is bound to the content when delivered with a delivery specification. This delivery information may be bound by the content producers 130 at the time of submission of the content to the content database 235.

The delivery specification may also include additional information in the form of instructions or code executable by the hosting server, that specifies details about the delivery, viewing, and formatting of the content. This additional may also specify how the content can be delivered and viewed in a final context. The aggregation specification is a first portion of the delivery specification which involves how the content is assembled for delivery. The aggregation of content deals with three content and delivery situations. The first consideration in the aggregation of content involves the number of pieces of content involved in delivery. A single piece of content may simply be amassed with other delivery specification information and sent for delivery to a specified set or type of recipients 120. When content delivery involves a number of content items, the aggregation specification deals with whether the content items can be delivered for viewing as a single digest of content or whether the content can appear among further content. Firstly, the aggregation specification specifies a digest within which to aggregate the content items. A digest operates as a container of the content items and provides a wrapper for including the delivery and viewing specification in the further handling of the delivery and viewing of digest contents. Considerations that are made during the aggregating of content for delivery are urgency, expiration date (i.e., date marking the end of a period of time that the content is timely or valid), and formatting considerations for single item viewing.

Along with the aggregation of the content, the content delivery system 300 can decide how to send a particular piece of content. The dispatcher 265 may receive instructions to send the content immediately as a single email, wait until the dispatcher 265 receives multiple pieces of content and send them all as a digest, or include the content in a future digest of multiple content types.

The content delivery system 300 can also conduct random testing of the content in the digest emails. The typical email digest may contain many pieces of content, which may require that the content be tested in an automated fashion. The content delivery system 300 can provide feedback to the content producers 130, so that a determination can be made whether their content is interesting and engaging to recipients 120. This type of testing and subsequent interest levels in content being fed back to content producers 130, may provide recipients 120 with new types of content subsequent to the feedback of the testing results. The content delivery system 300 may also keep track of the number of times a user may have seen content of a particular type and not interacted with the content. Keeping track of this metric may gauge the recipient's 120 interest in that type of content. A further consideration when a lack of interest or interaction with the content is determined is that there may be something about the content that may appear as email spam to the recipient 120. This feedback may allow the content producers 130 to adjust the presentation and formatting of the content view so that the recipient 120 may be assured of having at least some level of interaction with the content to accompany the content interaction metric.

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by at least one processor or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 8:
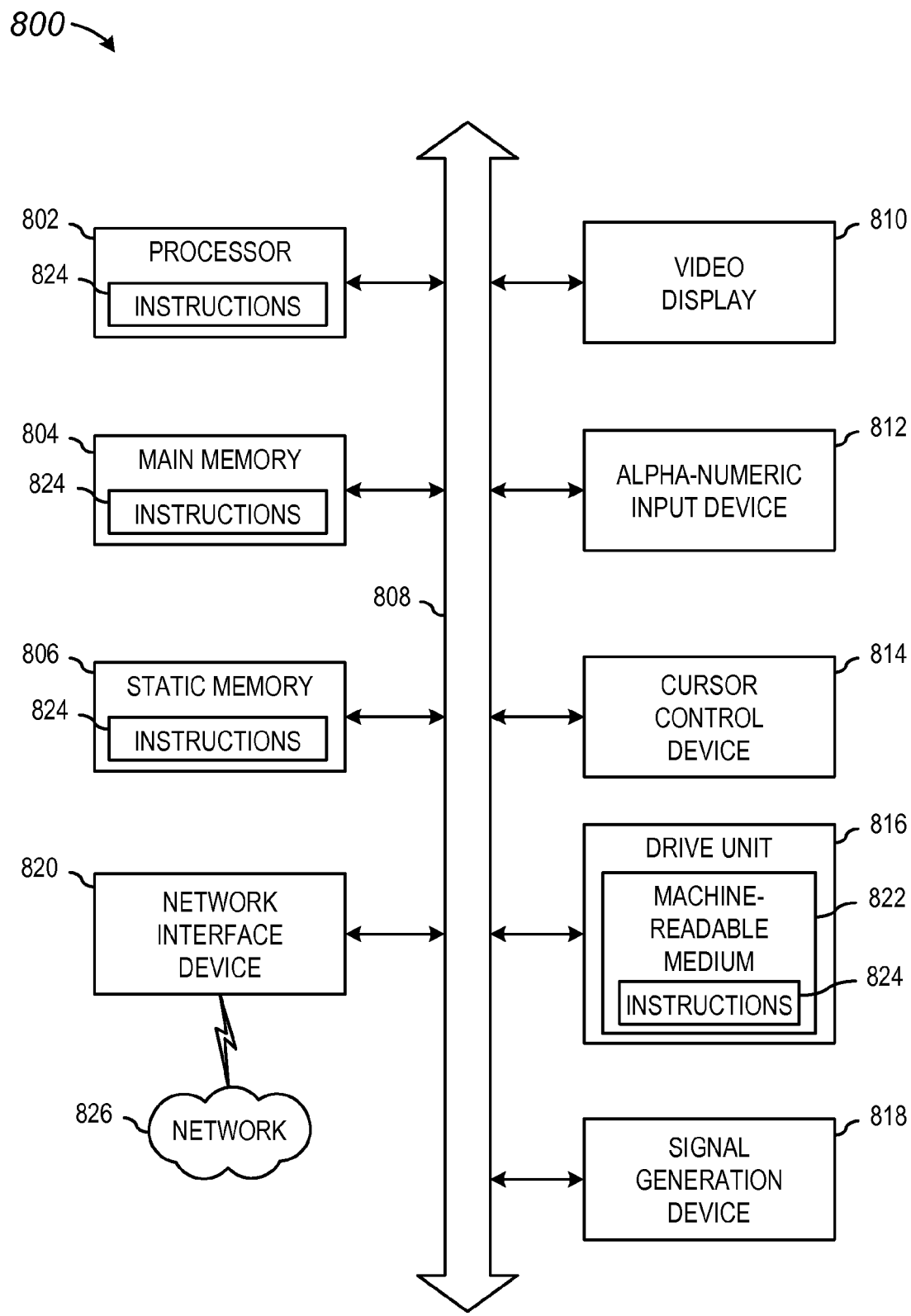
FIG. 8 is a block diagram of machine in the example form of a computer system within which a set instructions may be executed, for causing the machine to perform any one or more of the methodologies discussed herein.

FIG. 8 is a block diagram of a machine in the example form of a computer system 800 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a user interface (UI) navigation device 814 (e.g., a mouse), a disk drive unit 816, a signal generation device 818 (e.g., a speaker) and a network interface device 820.

The disk drive unit 816 includes a machine-readable storage device 822 on which is stored one or more sets of instructions and data structures (e.g., software) 824 embodying or utilized by any one or more of the methodologies or functions described herein. The instructions 824 may also reside, completely or at least partially, within the main memory 804 and/or within the processor 802 during execution thereof by the computer system 800, the main memory 804 and the processor 802 also constituting machine-readable media.

While the machine-readable storage device 822 is shown in an example embodiment to be a single device, the term "machine-readable storage device" may include a single storage device or multiple storage devices (e.g., a centralized or distributed database, and/or associated caches and servers) that store the one or more instructions or data structures. The term "machine-readable storage device" shall also be taken to include any tangible medium that is capable of storing or encoding instructions for execution by the machine and that cause the machine to perform any one or more of the methodologies of the present invention, or that is capable of storing or encoding data structures utilized by or associated with such instructions. The term "machine-readable storage device" shall accordingly be taken to include, but not be limited to, solid-state memories, and optically programmed non-transitory media and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Although the present invention has been described with reference to specific example embodiments, it will be evident that various modifications and changes may be made to these embodiments without departing from the broader scope of the invention. Accordingly, the specification and drawings are to be regarded in an illustrative rather than a restrictive sense.

Plural instances may be provided for components, operations, or structures described herein as a single instance. Finally, boundaries between various components, operations, and data stores may be somewhat arbitrary, and particular operations may be illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s). One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding," "locating," "permitting," and the like, are executed by application logic that accesses, and/or causes changes to, various data attribute values maintained in a database or other memory. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, system features, and system mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. The specification and drawings are, accordingly, to be regarded in an illustrative rather than a restrictive sense. It will, however, be evident that various modifications and changes may be made thereunto without departing from the broader scope of the disclosure as set forth in the claims and that the disclosure is intended to cover all modifications and equivalents within the scope of the following claims.

The Abstract of the Disclosure is provided to comply with rules requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:

receiving a job specification;

delivering content to a recipient device according to a delivery schedule comprising a delivery frequency of the content determined by the job specification;

receiving one or more content interaction indicators from the recipient device, the content interaction indicators respectively indicating an amount of content interaction at the recipient device and an interaction timeframe;

calculating a recipient interest level according to the amount of content interaction occurring the interaction timeframe;

using at least one processor, calculating an updated delivery schedule, based on the recipient interest level, by adjusting the delivery frequency, the updated delivery schedule specifying a higher delivery frequency when the recipient interest level is higher than a previous recipient interest level; and delivering further content having an increased volume of content to the recipient device according to the updated delivery schedule when the recipient interest level indicates a content interaction level exceeding an upper interaction threshold.

2. The method of claim 1, further comprising delivering additional content, having a decreased volume of content, to the recipient device according to the updated delivery schedule when the recipient interest level indicates a content interaction level below a lower interaction threshold.

3. The method of claim 1, further comprising:

retrieving a recipient type corresponding to a recipient designator and a content type corresponding to the content;

linking the recipient type and the content type to the recipient interest level; and storing the recipient interest level according to recipient type and the content type in a delivery database.

4. The method of claim 1, further comprising:

receiving a further content interaction indicator, including a recipient context having a location and an interaction time, from the recipient device;

retrieving the location and the interaction time from the recipient context;

wherein calculating an updated delivery schedule further comprises calculating the updated delivery schedule corresponding to the location and the interaction time;

receiving an indication of a further location and a further interaction time from the recipient device; and wherein delivering further content comprises delivering the further content according to the updated delivery schedule when the further location and the further interaction time correspond with the location and the interaction time.

5. The method of claim 1, further comprising:

receiving a further content interaction indicator including a recipient context having a device type;

retrieving the device type from the recipient context;

retrieving device characteristics corresponding to the device type;

aggregating the further content in correspondence with the device characteristics;

formatting the further content according to the device characteristics; and wherein delivering further content comprises delivering the further content formatted according to the device characteristics.

6. The method of claim 1, further comprising:
receiving a further job specification including a further aggregation specification and a content designator from the client device;
calculating an aggregation configuration according to the further aggregation specification;
creating an updated aggregation specification corresponding to the aggregation configuration;
retrieving the further content according to the content designator; and
wherein delivering further content comprises delivering the further content according to the updated aggregation specification, the further content determined by the content designator,
wherein the content designator includes a content identifier, a content type, and a preferred recipient type.

7. The method of claim 6, wherein the aggregation specification includes a recipient specification, the method further comprising:
determining a recipient type according to the recipient specification;
retrieving at least an initial portion of the content corresponding to the recipient type from a recipient database; and
aggregating content according to the aggregation specification to produce the content.

8. The method of claim 1, further comprising analyzing the job specification to determine a recipient type from a recipient designator, the delivery schedule from a delivery specification, an aggregated content and an aggregation configuration from an aggregation specification, wherein the recipient designator, the delivery specification, and the aggregation specification are included in the job specification.

9. The method of claim 1, further comprising:
querying the updated delivery schedule to determine a content volume and a delivery time over which the further content is delivered;
retrieving an upper delivery threshold and a lower delivery threshold from a database;
calculating a delivery quotient corresponding to the content volume divided by the delivery time;
reducing a volume of the content delivered to the recipient device in the updated delivery schedule when the delivery quotient exceeds the upper delivery threshold; and
reducing a delivery frequency in the updated delivery schedule when the delivery quotient exceeds the upper delivery threshold.

10. The method of claim 1, further comprising:
retrieving a recipient profile indicator including a recipient type, a desired content type, and a desired delivery schedule from a recipient database;
respectively comparing a preferred recipient type, the desired content type, and a preferred delivery schedule, included in the job specification, with the recipient type, desired content type, and desired delivery schedule; and
scheduling delivery of the further content when there is a substantial match between at least one of the preferred recipient type and the recipient type, the desired content type, and the preferred delivery schedule and the desired delivery schedule.

11. A non-transitory machine-readable storage medium including instructions, that when implemented by at least one processor, perform operations comprising:
receiving a job specification;
delivering content to a recipient device according to a delivery schedule comprising a delivery frequency of the content determined by the job specification;
receiving one or more content interaction indicators from the recipient device, the content interaction indicators respectively indicating an amount of content interaction at the recipient device and an interaction timeframe;
calculating a recipient interest level according to the amount of content interaction occurring in the interaction timeframe;
using at least one processor, calculating an updated delivery schedule, based on the recipient interest level, by modifying the delivery frequency, the updated delivery schedule a higher deliver frequency when the recipient interest level is higher than a previous recipient interest level; and
delivering further content having an increased volume of content to the recipient device according to the updated delivery schedule when the recipient interest level indicates a content interaction level exceeding an upper interaction threshold.

12. The operations of claim 11, further comprising delivering additional content, having a decreased volume of content, to the recipient device according to the updated delivery schedule when the recipient interest level indicates a content interaction level below lower interaction threshold.

13. The operations of claim 11, further comprising:
retrieving a recipient type corresponding to a recipient designator and a content type corresponding to the content;
linking the recipient type and the content type to the recipient interest level; and
storing the recipient interest level according to recipient type and the content type in a delivery database.

14. The operations of claim 11, further comprising:
receiving a further content interaction indicator, including a recipient context having a location and an interaction time, from the recipient device;
retrieving the location and the interaction time from the recipient context;
wherein calculating an updated delivery schedule further comprises calculating the updated delivery schedule corresponding to the location and the interaction time;
receiving an indication of a further location and a further interaction time from the recipient device; and
wherein delivering further content comprises delivering the further content according to the updated delivery schedule when the further location and the further interaction time correspond with the location and the interaction time.

15. The operations of claim 11, further comprising:
receiving a further content interaction indicator including a recipient context having a device type;
retrieving the device type from the recipient context;
retrieving device characteristics corresponding to the device type;
aggregating the further content in correspondence with the device characteristics;
formatting the further content according to the device characteristics; and
wherein delivering further content comprises delivering the further content formatted according to the device characteristics.

16. The operations of claim 11, further comprising:
receiving a further job specification including a further aggregation specification and a content designator from the client device;
calculating an aggregation configuration according to the further aggregation specification;

creating an updated aggregation specification corresponding to the aggregation configuration;

retrieving the further content according to the content designator; and wherein delivering further content comprises delivering the further content according to the updated aggregation specification, the further content determined by the content designator, wherein the content designator includes a content identifier, a content type, and a preferred recipient type.

17. The operations of claim 16, wherein the aggregation specification includes a recipient specification, the operations further comprising:

determining a recipient type according to the recipient specification;

retrieving at least an initial portion of the content corresponding to the recipient type from a recipient database; and aggregating content according to the aggregation specification to produce the content.

\* \* \* \* \*